United States Patent [19]

Solc

[11] Patent Number: 4,680,200

[45] Date of Patent: Jul. 14, 1987

[54] METHOD FOR PREPARING COLLOIDAL SIZE PARTICULATE

[75] Inventor: Jitka Solc, Midland, Mich.

[73] Assignee: The Dow Chemical Company, Midland, Mich.

[21] Appl. No.: 757,238

[22] Filed: Jul. 22, 1985

[51] Int. Cl.$^4$ ............................................. B01J 13/02
[52] U.S. Cl. ......................... 427/213.34; 106/308 M; 252/610; 428/402.24; 430/111; 526/909; 526/911
[58] Field of Search .............. 427/213.34; 106/308 M; 526/909, 911

[56] References Cited

U.S. PATENT DOCUMENTS

| | | | |
|---|---|---|---|
| 2,579,908 | 12/1951 | Davison et al. | 526/909 X |
| 3,338,991 | 8/1967 | Insalaco et al. | 430/137 |
| 3,544,500 | 12/1970 | Osmond et al. | 106/308 M |
| 3,830,750 | 8/1974 | Wellman | 428/402.24 X |
| 4,049,604 | 9/1977 | Morehouse, Jr. et al. | 524/460 |
| 4,421,660 | 12/1983 | Solc nee Hajna | 252/62.54 |

*Primary Examiner*—Richard D. Lovering

[57] ABSTRACT

Colloidal size particles of an organic solid such as a pigment are encapsulated in a hydrophobic addition polymer such as a polymer of styrene by a polymerization process wherein a water-immiscible (hydrophobic) monomer is dispersed in an aqueous colloidal dispersion of the organic particles and subjected to conditions of emulsion polymerization. The resulting encapsulated particles are usefully employed as toners and pigments.

6 Claims, No Drawings

METHOD FOR PREPARING COLLOIDAL SIZE PARTICULATE

BACKGROUND OF THE INVENTION

This invention relates to colloidal size particulates containing particles of a solid, water-insoluble organic material and to polymerization processes used to prepare such particulates.

Metals, metal oxides, pigments, fillers and other inorganic particulates that tend to agglomerate are often coated with or encapsulated in hydrophobic polymers. These coated or encapsulated particles are often used in a wide variety of applications such as electroconductive additives to plastics, toners in electrophotographic applications, pigmented paints as well as many other applications.

Conventionally, such particulates are prepared by (1) treating the inorganic solid with acid, a combination of acid and base, alcohol or a polymer solution; (2) dispersing an addition polymerizable monomer in an aqueous dispersion of a treated inorganic solid and (3) subjecting the resulting dispersion to emulsion polymerization conditions. Examples of such methods are described in U.S. Pat. Nos. 4,048,136; 4,194,920; 3,383,346; 3,935,340; 3,544,500 and 3,884,871. Unfortunately, these methods are deficient in that they often require expensive multi-step procedures, anchoring agents, functional additives, stabilizing agents, and the like. Also, the polymeric particulates often must be employed as viscous pastes or dry powders.

More recently, as disclosed in U.S. Pat. No. 4,049,604, aqueous dispersions of organic polymeric particles are provided by dispensing an oil phase containing emulsion polymerizable monomers in an aqueous phase containing an emulsifier and a sulfo ester containing a polymer, and subjecting the dispersion to emulsion polymerization conditions. The resulting polymeric products are described as microspheres which are useful as coating compositions or microspheres having liquid centers.

Colloidal size inorganic materials have been disclosed as being dispersed in hydrophobic polymers in U.S. Pat. No. 4,421,660. However, the dispersion of organic materials such as organic dyes or pigments in such hydrophobic polymers is not taught or suggested.

In view of the deficiencies of the prior art methods for preparing such particulates, an improved method which eliminates or substantially reduces the adverse effects of the aforementioned procedure deficiencies is highly desirable. In addition, it would be highly desirable to provide a dispersion of colloidal organic materials in hydrophobic polymers.

SUMMARY OF THE INVENTION

In one aspect, the present invention is such a method which comprises the steps of (1) emulsifying a hydrophobic, emulsion polymerizable monomer in an aqueous colloidal dispersion of discrete particles of essentially water-insoluble organic solid and (2) subjecting the resulting emulsion to emulsion polymerization conditions to form a stable, fluid aqueous colloidal dispersion of the organic solid particles dispersed in a matrix of a water-insoluble polymer comprising the hydrophobic monomer. Surprisingly, dispersion of the essentially water-insoluble organic solid particles into the polymer matrix is achieved by a process having an emulsion polymerization step without pretreating the particles with polymer, acid or other conventional anchoring agent prior to the emulsion polymerization step. Also, in the colloidal size polymer matrix having the organic solid dispersed therein, the organic solid particles remain in a discrete, essentially nonagglomerated form. Hereinafter, this colloidal size matrix is called "matrix particulate" or "matrix particles". Thus, the discrete organic solid particles are entirely coated with polymer. Moreover, in many particles of the particulate (colloidal size polymer matrix), two or more organic particles reside in a spaced-apart relationship.

In another aspect, this invention is the aforementioned matrix particulate. In the matrix particles, the organic particles exist as discrete nonaggregated particles, each of said particles being surrounded by the polymer matrix.

The matrix particulates of this invention are particularly useful in applications requiring a colloidal size particulate having pigmentary properties. Examples include paint additives, color toners, printing media additives, color display additives, laser printing additives, membrane chloroplasts, and the like.

DETAILED DESCRIPTION OF ILLUSTRATIVE EMBODIMENTS

Organic solids suitably employed in the practice of this inventon are organic materials in the form of colloidal particles, i.e., have average diameters generally less than about 0.9 micrometer, preferably from about 0.005 to about 0.7 micrometer, most preferably from about 0.005 to about 0.5 micrometer, which particles tend to form aggregates if not treated with a dispersant or surface active agent. When dispersed in water, these organic particulates tend to aggregate or agglomerate upon standing. Often, as a result of such agglomeration, the organic particles settle to the lower region of the aqueous dispersion. Typically, these solids are insoluble in water and are incapable of adsorbing more than 5 weight percent of water based on the weight of the solid. Examples of such organic solids are the essentially water-insoluble organic pigments such as the rhodamines, the phthalocyanines and the azo lakes as well as those pigments disclosed in U.S. Pat. No. 4,194,920, which is incorporated herein by reference. Other examples of such organic solids are the essentially water-insoluble organic fire retardant additives such as decabromodiphenyloxide.

Chemical dispersants and/or surfactants as described hereinafter are used to maintain the aqueous dispersions in a reasonably stable state. Similar aqueous colloid dispersions of organic solids are prepared by conventional techniques used in the manufacture of colloidal polymer emulsions.

The hydrophobic monomers employed in the practice of this invention are essentially water-immiscible, i.e., the monomer forms a separate phase when 5 g of monomer is mixed with 100 g of water, such water-immiscible monomer(s) will polymerize under emulsion polymerization conditions to form a water-insoluble polymer which will exist in the form of a stable aqueous colloidal dispersion, usually with the aid of suitable surface active agents. Examples of suitable hydrophobic monomers include monovinylidene aromatic monomers such as styrene, vinyl toluene, t-butyl styrene, chlorostyrene, vinylbenzyl chloride and vinyl pyridine; alkyl esters of $\alpha,\beta$-ethylenically unsaturated acids such as ethyl acrylate, methyl methacrylate, butyl acrylate and 2-ethylhexyl acrylate; unsaturated esters of saturated carboxylic acids such as vinyl acetate, unsaturated halides such as vinyl chloride and vinylidene chloride; unsaturated nitriles such as acrylonitrile; dienes such as butadiene and isoprene; and the like. Of these monomers, the monovinylidene aromatics such as styrene and the alkyl acrylates such as butyl acrylate are preferred. In addition to the aforementioned hydrophobic monomer, relatively minor portions, e.g., less than 10, preferably less than 5 weight percent based on total monomer component, of a water-soluble monomer such as an ethylenically unsaturated carboxylic acid or its salt such as acrylic acid or sodium acrylate; methacrylic acid; itaconic acid and maleic acid; an ethylenically unsaturated carboxamide such as acrylamide; vinyl pyrrolidone; hydroxyalkyl acrylates and methacrylates such as hydroxyethyl acrylate, hydroxypropyl acrylate and hydroxyethyl methacrylate; aminoalkyl esters of unsaturated acids such as 2-aminoethyl methacrylate; epoxy functional monomers such as glycidyl methacrylate; sulfoalkyl esters of unsaturated acids such as 2-sulfoethyl methacrylate; ethylenically unsaturated quaternary ammonium compounds such as vinylbenzyl trimethyl ammonium chloride may be employed. It is critical however, that such water-soluble monomers not be employed in amounts sufficient to render the resulting polymer soluble in water. Particularly effective monomer recipes for the practice of this invention are those containing from about 20 to about 90 weight percent of styrene from about 10 to about 80 weight percent of alkyl acrylate such as butyl acrylate and from about 0.01 to about 2 weight percent of the unsaturated carboxylic acids, such as acrylic acid, with said weight percentages being based on the weight of total monomers.

In the practice of this invention, it is preferred to initially prepare an aqueous colloidal dispersion of the organic solid by contacting said solid with an aqueous solution of a water-soluble surfactant or emulsifier thereby forming the dispersion which contains from about 5 to about 70 weight percent of the organic solid. Typically, suitable surface active agents or emulsifiers include salts of fatty acids such as potassium oleate, metal alkyl sulfates such as sodium lauryl sulfate, salts of alkylaryl sulfonic acids such as sodium dodecylbenzene sulfonate, polysoaps such as sodium polyacrylate and alkali metal salts of methyl methacrylate/2-sulfoethyl methacrylate copolymers and other sulfoalkyl acrylate copolymers, and other anionic surfactants such as the dihexyl ester of sodium sulfosuccinic acid; nonionic surfactants such as the nonionic condensates of ethylene oxide with propylene oxide, ethylene glycol and/or propylene glycol; and cationic surfactants such as alkylamineguanidine polyoxyethanols, as well as a wide variety of micelle generating substances described by D. C. Blackley in *Emulsion Polymerization,* Wiley and Sons, Chapter 7 (1975) and other surfactants listed in McCutcheon's *Detergents and Emulsifiers,* 1980 Annual, North American Edition, McCutcheon, Inc., Morristown, N.J. Also included among the suitable surfactants are the surface active polymers (often called polysoaps), e.g., those described in U.S. Pat. No. 3,965,032. Of the suitable surfactants, the anionic varieties such as the potassium salts of functionalized oligomers, e.g., Polywet varieties sold by Uniroyal Chemical are preferred. Such surface active agents or emulsifiers are employed in amounts sufficient to provide a stable dispersion of the organic solid in water. Preferably, such surface active agents are employed in concentrations in the range from about 0.2 to about 10, most preferably from about 1 to about 6 weight percent based on the aqueous phase. Particularly desirable processes for forming aqueous colloidal dispersions of solids are described in U.S. Pat. Nos. 3,826,667; 3,981,844; 4,194,920; 3,843,540 and *Industrial Engineering Production and Research Development,* Vol. 19, pp. 147–151 (1980).

The aqueous dispersion of organic solid is then combined with the water-immiscible monomer to form the desired emulsion by normal mixing procedures, for example, passing both the dispersion and monomer through a high shear mixing device such as a Waring blender, homogenizer or ultrasonic mixer. Alternatively and preferably, the monomer is added continuously to the aqueous dispersion of organic solid during the polymerization. Advantageously, the monomer is in the form of an aqueous emulsion of the monomer which emulsion is maintained by a water-soluble monomer and/or a water-soluble emulsifier such as described hereinbefore. As another alternative, the aqueous emulsion of organic solid and water-immiscible monomer can be prepared by adding colloidal size organic particles to an existing aqueous emulsion of monomer. In such instances, it is often desirable to add additional emulsifier to the emulsion prior to or simultaneous with the addition of the organic solid. In the emulsion of organic solid and water-immiscible monomer, the aqueous phase is present in a proportion sufficient to be the continuous phase of the emulsion. The organic solid is present in proportions sufficient to provide the matrix particulate, with the desired characteristics, e.g., fire retardancy, light absorption, pigmentation, etc. The water-immiscible monomer is present in proportion sufficient to enclose or encapsulate the organic solid when polymerized, and sufficient emulsifier and/or surface active agent is present to provide an aqueous colloidal emulsion which is sufficiently stable to be subjected to emulsion polymerization conditions. Preferably, the emulsion contains from about 0.1 to bout 25 weight percent of organic solid, from about 1 to about 30 weight percent of monomer and a remaining amount of the aqueous phase including emulsifier (surfactant), catalyst and the like.

The emulsion polymerization conditions employed in the practice of this invention are generally conventional free-radical type polymerizations carried out in the presence of a radical initiator such as a peroxygen compound, an azo catalyst, ultraviolet light and the like. Preferably, such polymerization is carried out in the presence of a water-soluble peroxygen compound at temperatures in the range from about 50° to 90° C. The emulsion is generally agitated during the polymerization period in order to maintain adequate feed transfer. The concentration is normally in the range from about 0.005 to about 8, preferably from about 0.01 to about 5 weight percent based on total monomer. Examples of suitable catalysts include inorganic persulfate compounds such as sodium persulfate, potassium persulfate and ammonium persulfate; peroxides such as hydrogen peroxide, t-butylhydroperoxide, dibenzoyl peroxide and dilauroyl peroxide; azo catalysts such as azobisisobutyronitrile, and other common free radical generating compounds. Also suitable are various forms of free radical generating radiation means such as ultraviolet radiation, electron beam radiation and gamma radiation. Alternatively, a redox catalyst composition can be employed wherein the polymerization temperature ranges from about 25° to about 80° C. Exemplary redox catalyst compositions include a peroxygen compound as described hereinbefore, preferably potassium persulfate or t-butyl hydroperoxide and a reducing component such as sodium metabisulfite and sodium formaldehyde hydrosulfite. It is also suitable to employ various chain transfer agents such a mercaptans, e.g., dodecyl mercaptan; dialkyl xanthogen disulfies; diaryl disulfides and others listed in Blackley, supra, Chapter 8 in concentrations as described therein.

Following emulsion polymerization, the emulsion polymerizate can be withdrawn from the polymerization vessel and (1) the emulsion is employed as is or (2) the unreacted monomer and other volatiles are removed to form a concentrated emulsion and then used or (3) the matrix particulate can be separated from the aqueous continuous phase of the dispersion by conventional means such as drying under vacuum or spray drying. The dried matrix particulate preferably contains from about 1 to about 80 weight percent of organic solid and from about 99 to about 20 weight percent of polymer matrix.

The following examples are given to illustrate the invention and should not be construed as limiting its scope. Unless otherwise indicated, all parts and percentages are by weight.

EXAMPLE 1

A dispersion of organic pigment in an aqueous medium is provided by dispersing 40 g of an organic pigment in 52 g of deionized water containing 8.8 g of a 45 percent aqueous solution of a potassium salt of a functionalized oligomer sold by Uniroyal Chemical under the tradename "Polywet KX-3". The organic pigment is Diarylide Yellow Presscake, X-2600 which is manufactured by Hercules, Incorporated and is derived from the coupling of diazotized 3,3'-dichlorobenzene with aceto acet-o-aniside.

Into a three-necked flask equipped with a stirrer, addition funnel and condenser is charged a mixture of 10 g of the previously described organic pigment dispersion, 160 g of deionized water, 17 g of the "Polywet KX-3" solution, 1.5 g of a 1N sodium hydroxide solution and 40 g styrene. The mixture is agitated for 3 minutes with an ultrasonic probe before said mixture is charged into said flask. The mixture is heated to 90° C. in said flask under nitrogen atmosphere and with agitation. When the mixture reaches 90° C., an aqueous stream containing 4.4 g sodium persulfate, 1 g of a 1N sodium hydroxide solution and 10 g deionized water is added dropwise over a 65-minute period. The latex dispersion which results comprises 19.2 percent solids. The residual monomer and water are removed by freeze drying to yield a fine powder polymer encapsulated yellow pigment.

EXAMPLE 2

A dispersion of organic pigment in an aqueous medium is provided by dispersing 40 g of an organic pigment in 52.2 g of deionized water containing 8.8 g of a 45.4 percent aqueous solution of a potassium salt of a functionalized oligomer sold by Uniroyal Chemical under the tradename "Polywet KX-3". The organic pigment is Calcium 2B Rubine Presscake, X-2430, which is manufactured by Hercules, Incorporated and is derived from the coupling of the calcium salt of diazotized 6-amino-4-chloro-m-toluenesulfonic acid with 3-hydroxy-2-napthoic acid.

Into a three-necked flask equipped with a stirrer, addition funnel and condenser is charged a mixture of 10 g of the previously described organic pigment dispersion, 140 g of deionized water and 40 g styrene. The organic pigment dispersion deionized water and styrene mixture is agitated for 3 minutes with an ultrasonic probe followed by addition of 0.2 g of sodium persulfate dissolved in 2 g of deionized water before said mixture is charged into said flask. The mixture is heated to 80° C. in said flask under nitrogen atmosphere and with agitation. When the mixture reaches 80° C., an aqueous stream containing 0.6 g sodium persulfate, 3 g of a 1N sodium hydroxide solution and 45 g deionized water is added dropwise over a 75-minute period. The latex dispersion which results comprises 16.9 percent solids. The residual monomer and water are removed by freeze drying to yield a fine powder polymer encapsulated red pigment.

EXAMPLE 3

A dispersion of organic pigment in an aqueous medium is provided by dispersing 80 g of the yellow organic pigment described in Example 1 in 100 g of deionized water containing 10 g of a 40 percent aqueous solution of a potassium salt of a functionalized oligomer sold by Uniroyal Chemical under the tradename "Polywet KX-4".

Into the flask described in Example 1 is charged a mixture of 166 g of the previously described organic pigment dispersion, 251 g of deionized water, 4.4 g of "Polywet KX-4", 6 g of a 1N sodium hydroxide solution, 40 g butylacrylate, 40 g styrene and 0.3 g of sodium persulfate dissolved in 2 g of deionized water. The organic pigment dispersion, deionized water, "Polywet KX-4", sodium hydroxide solution, styrene and acrylate mixture is agitated for 3 minutes with an ultrasonic probe followed by addition of the sodium persulfate solution before said mixture is charged into said flask. The mixture is heated to 90° C. in said flask under nitrogen atmosphere and with agitation. When the mixture reaches 90° C., an aqueous stream containing 2.8 g sodium persulfate, 8.4 g of 1N sodium hydroxide solution and 10 g of deionized water is added over a 90-minute period. The latex dispersion which results comprises 19 percent solids. The residual monomer is removed by distillation under vacuum. The film-forming latex dispersion contains 36.2 percent solids.

EXAMPLE 4

A dispersion of organic pigment in an aqueous medium is provided by dispersing 40 g of the red organic pigment described in Example 2 in 52 g of deionized water containing 10 g of a 40 percent aqueous solution of a potassium salt of a functionalized oligomer sold by Uniroyal chemical under the tradename "Polywet KX-4".

Into the flask described in Example 1 is charged a mixture of 10 g of the previously described organic pigment dispersion, 180 g of deionized water, 1.8 g of "Polywet KX-4", 1.5 g of a 1N sodium hydroxide solution, 20 g butylacrylate and 20 g styrene. The mixture is agitated for 3 minutes with an ultrasonic probe before said mixture is charged into said flask. The mixture is heated to 90° C. in said flask under nitrogen atmosphere and with agitation. When the mixture reaches 90° C., an aqueous stream containing 0.7 g sodium persulfate, 1.5 g of 1N sodium hydroxide solution and 10 g of deionized water is added over a 90-minute period. The latex dispersion which results comprises 17.5 percent solids. The residual monomer is removed by distillation under vacuum. The film-forming latex dispersion contains 36.4 percent solids.

EXAMPLE 5

Formulations are provided and cast as films on paper as follows:

Formulation No. 1 is provided by blending (a) a 40 percent solids latex dispersion which solids comprise 13 percent titanium dioxide (sold commercially as Ti-Pure R-900 by E. I. duPont de Nemours) encapsulated in 87 percent of a polymer matrix which comprises, in polymerized form, 50 percent styrene and 50 percent butylacrylate and which is prepared as taught in U.S. Pat. No. 4,421,660 and (b) a 19.2 percent solids dispersion of Example 1. The two dispersions are blended in amounts sufficient to provide a dispersion containing 11 percent titanium dioxide and 1 percent of the yellow pigment, based on solids.

Formulation No. 2 is provided by blending (a) a 46.4 percent solids latex dispersion which solids comprise, in polymerized form, 50 percent styrene and 50 percent butyl acrylate; (b) titanium dioxide in an amount sufficient to provide a dispersion containing 11 percent titanium dioxide, based on solids; and (c) the Diarylide Yellow Presscake pigment described in Example 1 in an amount sufficient to provide a dispersion containing 1 percent of the yellow pigment, based on solids.

Formulation No. 3 is provided by blending (a) a 46.4 percent solids latex dispersion which solids comprise, in polymerized form, 50 percent styrene and 50 percent butylacrylate, (b) titanium dioxide in an amount sufficient to provide a dispersion containing 11 percent titanium dioxide, based on solids, (c) the Diarylide Yellow Presscake pigment described in Example 1 in an amount sufficient to provide a dispersion containing 1 percent of the yellow pigment, based on solids, and (d) about 1 percent based on solids of a viscosity modifier which is believed to be an ammonium polyacrylate solution and which is sold commercially as Acrysol® G110 by Rohm & Hass Corporation.

Formulation No. 4 is provided by blending (a) a 40 percent solids latex dispersion which solids comprise 13 percent titanium dioxide encapsulated in 87 percent of a polymer matrix which comprises, in polymerized form, 50 percent styrene and 50 percent butylacrylate and which is prepared as taught in U.S. Pat. No. 4,421,660; (b) the Diarylide Yellow Presscake pigment described in Example 1 in an amount sufficient to provide a dispersion containing 1 percent of the yellow pigment, based on solids; (c) about 1 percent based on solids of a viscosity modifier which is believed to be an ammonium polyacrylate solution and which is sold commercially as Acrysol® G110 by Rohm & Hass Corporation; and (d) a 46.4 percent solids latex dispersion which solids comprise, in polymerized form, 50 percent styrene and 50 percent butyl acrylate.

Formulation No. 5 is provided by blending Formulation No. 1 with about 1 percent based on solids of a viscosity modifier which is believed to be an ammonium polyacrylate solution and which is sold commercially as Acrysol® G110 by Rohm & Haas Corporation.

Formulation No. 6 is provided by blending (a) a 46.4 percent solids latex dispersion which solids comprise, in polymerized form, 50 percent styrene and 50 percent butyl acrylate; (b) titanium dioxide in an amount sufficient to provide a dispersion containing 11 percent titanium dioxide, based on solids; (c) a 19.2 percent solids dispersion of Example 1 in an amount sufficient to provide a dispersion containing 1 percent of the yellow pigment, based on solids; and (d) about 1 percent based on solids of a viscosity modifier which is believed to be an ammonium polyacrylate solution and which is sold commercially as Acrysol® G100 by Rohm & Haas Corporation.

Each of the Formulation Nos. 1-5 are cast as a film on paper and evaluated for color difference as taught in "Standard Method for Instrumental Evaluation of Color Difference of Opaque Materials", originally published in 1964 and revised in 1979 and having ASTM Method Designation D-2244-78 using a color difference Meter. Data are presented in Table I.

TABLE I

| Film Formulation No. | b-Value |
| --- | --- |
| 1 | +38.8 |
| 2* | +31.5 |
| 3* | +31.3 |
| 4* | +36.1 |
| 5 | +38.6 |
| 6 | +38.6 |

*Not an example of the invention.

The data in Table I indicate that the films provided using the formulations containing the organic pigment encapsulated latexes of this invention exhibit surprisingly high b-values.

EXAMPLE 6

A dispersion of decabromodiphenyloxide in an aqueous medium is provided by dispersing 400 g of the organic material having an average particle diameter of from 0.7 to 0.85 micron in 247 g of deionized water containing 99.6 g of a 48.2 percent aqueous solution of a potassium salt of a functionalized oligomer sold by Uniroyal Chemical under the tradename "Polywet AX-7". The mixture is sonicated 6 times at about 10 minutes each time using a Branson Sonifier Model 184V.

Into a three-necked flask equipped with a stirrer, addition funnel and condenser is charged a mixture of 400 g of the previously described organic dispersion, 1,172 g of deionized water, 0.45 g of a chelating agent sold commercially as Versenex® 80 by The Dow Chemical Company, and 8.8 g of a 1N sodium hydroxide solution. The mixture is heated to 70° C. in said flask under nitrogen atmosphere and with agitation. When the mixture reaches 70° C., an aqueous stream containing 6 g of a sodium formaldehyde hydrosulfite, composition sold commercially as Formopon by Rohm & Haas, and 94 g deionized water is added at a rate of 0.7 ml/min. Simultaneously to the addition of the aqueous stream is added a monomer stream containing 3 g styrene, 27 g methyl methacrylate and 7.5 g t-butylhydroperoxide at a rate of 0.7 ml/min. When addition of both feeds is completed, the reaction mixture is maintained under agitation and nitrogen atmosphere at 70° C. for an additional 30 minutes. The latex dispersion which results comprises 15 percent solids. The dispersion is distilled under vacuum and freeze dried to yield a fine powder polymer encapsulated fire retardant material.

EXAMPLE 7

A dispersion of decabromodiphenyloxide in an aqueous medium is provided by dispersing 400 g of the organic material in 506 g of deionized water containing 48 g of a surfactant sold by Arco Chemical Company under the tradename "SMA 2000" and 15 g of 28 percent ammonium hydroxide. The mixture is sonicated as described in Example 6.

Into a three-necked flask equipped with a stirrer, addition funnel and condenser is charged a mixture of 451.5 g of the previously described organic dispersion, 1,169.3 g of deionized water, 7.5 g of a "Polywet AX-7" solution, and 0.35 g of 2,2'-azobis(isobutyronitrile), sold commercially as Vazo 64 initiator by E. I. duPont de Nemours. The mixture is heated to 70° C. in said flask under nitrogen atmosphere and with agitation. When the mixture reaches 70° C., a monomer stream containing 26.3 g styrene and 8.78 g acrylonitrile is added at a rate of 0.5 ml/min. When addition of the monomer feed is complete, the reaction mixture is maintained under agitation and nitrogen atmosphere at 70° C. until the total reaction time equals 3 hours. The latex dispersion which results comprises 15 percent solids. The dispersion is distilled under vacuum and freeze dried to yield a fine powder polymer encapsulated fire retardant additive.

What is claimed is:

1. A method for preparing a colloidal size particulate comprising the steps of (1) emulsifying a hydrophobic, emulsion polymerizable monomer in an aqueous colloidal dispersion of essentially water-insoluble organic solid particles that have not been pretreated with polymer, acid or other conventional anchoring agents, said dispersion being maintained with a surfactant and/or emulsifier, and (2) subjecting the resulting emulsion to emulsion polymerization conditions to form a stable, fluid aqueous colloidal dispersion of the particulate wherein essentially every organic solid particle is coated with the hydrophobic polymer resulting from said polymerization such that substantially all of the organic particles are maintained in a discrete spaced apart relationship to each other by the hydrophobic polymer.

2. The method of claim 1 wherein the particles of organic solids have an average diameter of less than about 0.9 micrometer.

3. The method of claim 1 wherein the particles of organic solids are organic pigments.

4. The method of claim 1 wherein a water-soluble surfactant is used to emulsify the hydrophobic monomer, said surfactant being a potassium salt of a functionalized oligomer or a salt of a fatty acid.

5. The method of claim 1 wherein the monomer is a monovinylidene aromatic monomer, an alkyl ester of an ethylenically unsaturated carboxylic acid, or a mixture thereof.

6. The method of claim 5 wherein the polymer is a polymer of styrene and butyl acrylate.

* * * * *